(No Model.)

J. F. STRANGE.
SHADE FOR SPECTACLES OR EYEGLASSES.

No. 448,276. Patented Mar. 17, 1891.

Witnesses
Chas. F. Schmelz.
J. S. Lynch

Inventor
John F. Strange,
By his Attorney
S. Scholfield

United States Patent Office.

JOHN F. STRANGE, OF NEW BEDFORD, MASSACHUSETTS, ASSIGNOR TO HIMSELF AND JOSHUA B. WINSLOW, OF SAME PLACE.

SHADE FOR SPECTACLES OR EYEGLASSES.

SPECIFICATION forming part of Letters Patent No. 448,276, dated March 17, 1891.

Application filed September 4, 1890. Serial No. 363,910. (No model.)

*To all whom it may concern:*

Be it known that I, JOHN F. STRANGE, a citizen of the United States, residing at New Bedford, in the county of Bristol and State of Massachusetts, have invented a new and useful Improvement in Concentrating Shades for Spectacles or Eyeglasses, of which the following is a specification.

The object of my invention is to provide suitable means for shutting off the side light from the lenses of spectacles or eyeglasses, so that a clearer image will be formed in reading and in the close examination of objects; and my invention consists in the combination, with the lens of eyeglasses or spectacles, of a perforated protuberant shade, which may be either formed with the eyeglass or spectacle frame or permanently attached thereto, or be made removable therefrom, as hereinafter fully set forth.

Figure 1:
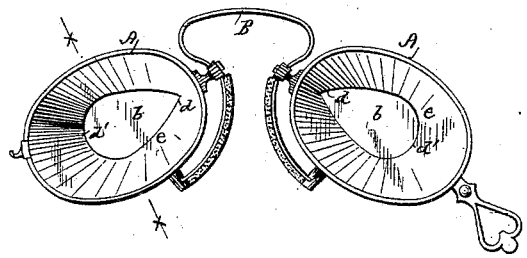
Figure 2:
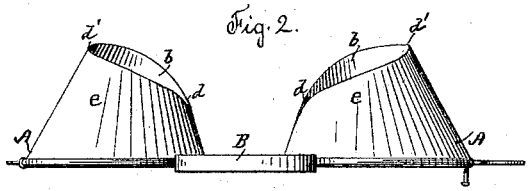
Figure 3:
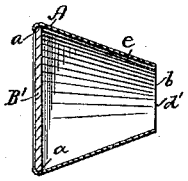
Figure 4:
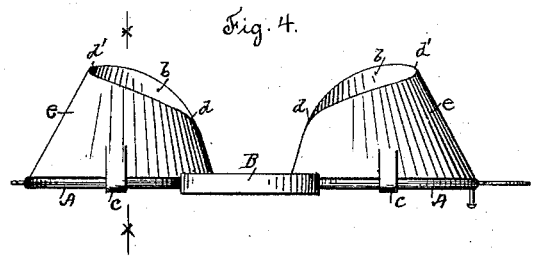
Figures 5, 6:
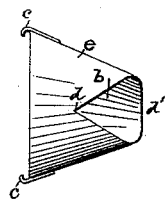

Figure 1 represents a back view of a pair of eyeglasses provided with my improvement, the shade being formed in one piece with the frame for the lens. Fig. 2 represents a top view of the same. Fig. 3 represents a vertical section taken in the line $x\ x$ of Fig. 1. Fig. 4 represents a top view showing a removable shade. Fig. 5 represents a side view of the shade removed from the frame. Fig. 6 represents a vertical section taken in the line $x\ x$ of Fig. 4.

In the accompanying drawings, A A in Figs. 1 and 2 represent the frames for the lenses of eyeglasses, and B the spring which connects the two lens-frames, the said frames being preferably made in protuberant conical form, provided with a groove $a$, adapted to receive the edge of the lens B', and with an elongated perforation $b$, thus forming at the outer side of the lens a protuberant concentrating-shade $e$, whereby the light from objects lying outside of the proper field of vision will be prevented from entering the eye, thus concentrating the vision upon a restricted field, whereby a sharper outline and clearer definition will be secured.

In Figs. 4 and 5 the concentrating-shade $e$ is represented as removable from the grooved frame which holds the lens B', and in this case I preferably provide the shade with the attaching ears or hooks $c\ c$, which serve to embrace the opposite edges of the frame A, as shown in the section Fig. 6.

The concentrating-shade $e$ may be made of metal, hard rubber, or any suitable material, and the form of the same may be greatly varied without departing from the spirit of my invention. The perforation $b$ is to be elongated inwardly from the direct line of the axis of the eye, and the inner edge $d$ of the said perforation is preferably made nearer the surface of the lens B than the outer edge $d'$.

I claim as my invention—

1. Spectacles or eyeglasses provided with a protuberant concentrating-shade having a perforation which is elongated inwardly from the direct line of sight through the lens, substantially as described.

2. The combination, with a pair of eyeglasses or spectacles, of a removably-attached protuberant concentrating-shade provided with a perforation which is elongated inwardly from the direct line of sight through the lens, substantially as described.

3. The combination, with a pair of eyeglasses or spectacles, of a removably-attached protuberant concentrating-shade provided with an elongated perforation, the inner edge of which is made nearer the lens than the outer edge, substantially as described.

4. The removable concentrating-shade for spectacles or eyeglasses, made in conical form with an elongated perforation and provided with attaching-hooks, substantially as described.

JOHN F. STRANGE.

Witnesses:
SOCRATES SCHOLFIELD,
JOHN S. LYNCH.